Figure 1:
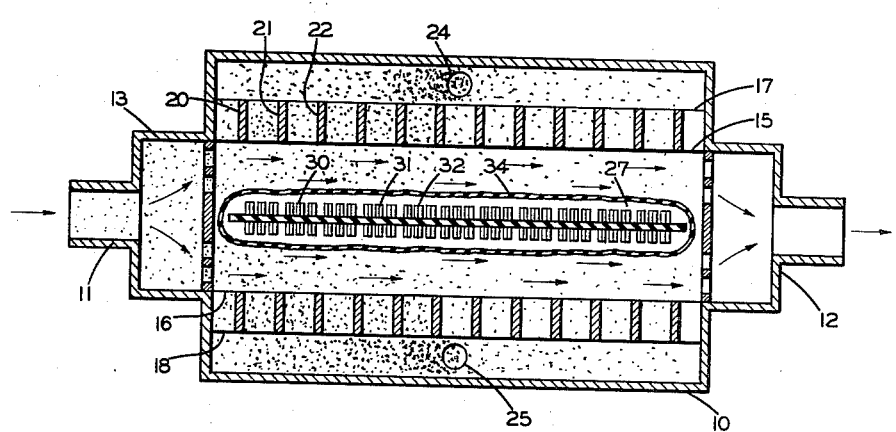

Sept. 7, 1954   J. W. BUTTERWORTH   2,688,402
APPARATUS AND METHOD FOR REMOVING PARTICLES FROM A LIQUID
Filed March 9, 1951   4 Sheets-Sheet 1

INVENTOR.
JOHN W. BUTTERWORTH
BY
ATTORNEY

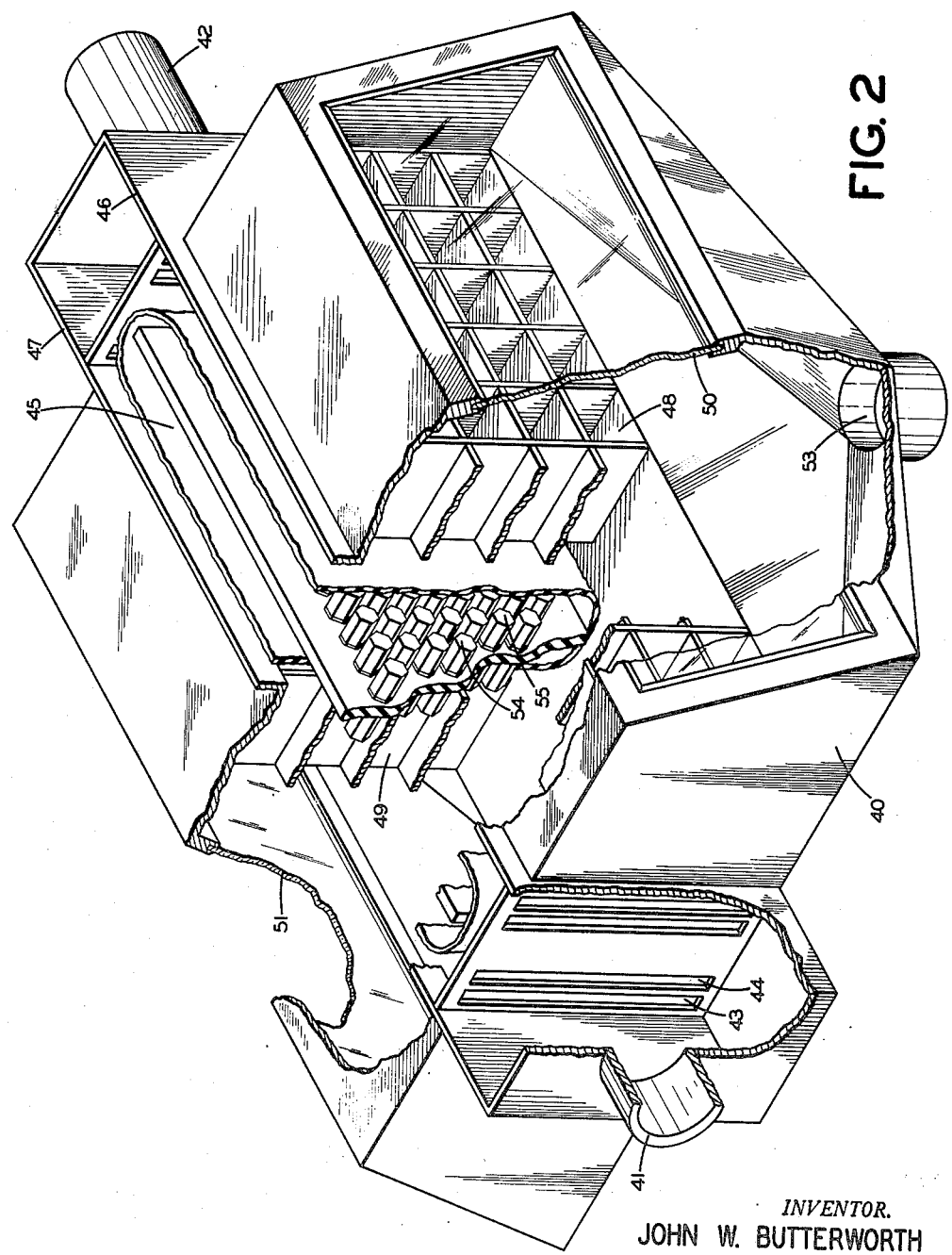

INVENTOR.
JOHN W. BUTTERWORTH
BY
ATTORNEY

Sept. 7, 1954 J. W. BUTTERWORTH 2,688,402
APPARATUS AND METHOD FOR REMOVING PARTICLES FROM A LIQUID
Filed March 9, 1951 4 Sheets-Sheet 4

INVENTOR.
JOHN W. BUTTERWORTH
BY
ATTORNEY

Patented Sept. 7, 1954

2,688,402

UNITED STATES PATENT OFFICE 2,688,402

APPARATUS AND METHOD FOR REMOVING PARTICLES FROM A LIQUID

John W. Butterworth, Cleveland Heights, Ohio, assignor, by mesne assignments, to Clevite Corporation, Cleveland, Ohio, a corporation of Ohio Application March 9, 1951, Serial No. 214,664

8 Claims. (Cl. 209—208)

This invention relates to a device for, or to a method of, changing the concentration of solid particles carried by a liquid medium and, particularly, to such a device or method in which the concentration is carried on to such an extent that the solid particles may be quite easily removed from the liquid medium.

There are many instances in commercial processes where it is desirable to remove solid particles from a liquid medium carrying the solid particles. One of the best illustrations is that of the waste waters of a paper mill which carry tremendous quantities of paper fibers which have passed through the Fourdrinier wire of the paper making machine and are thus effectively lost with the waste water. The cost of making paper is materially increased because of the loss of these fibers which flow off with the waste water, but this is not the major disadvantage facing the paper industry with reference to such lost fibers. Every paper mill discharges waste water at a very high rate when in operation. These waste waters are almost invariably carried off by the rivers or tributaries forming the natural drainage system of the area involved. Paper fibers carried by such waste waters are very detrimental from the standpoint of stream pollution. One of the worst effects caused by these paper fibers in such rivers and streams is that of destroying the fish life of the stream. Many States have enacted laws relating to this problem and, as a matter of fact, in many cases the paper mills involved are unable to comply with the laws because there has been no satisfactory method devolved for effectively removing such paper fibers from the waste water of the paper mill. Various attempts have been made to do so, such as the provision of large settling pools or ponds, and various methods for chemically treating the waste water of the paper mill have been considered. However there has in the past been available no satisfactory solution to the problem.

The present invention provides a device or a method for separating such paper fibers from the waste water of a paper mill and one which can be used continuously while the waste waters of the paper mill are being discharged at a rather high rate. Also, in many cases it is desirable in industrial processes to separate particles from a liquid medium carrying such particles on the basis of a physical characteristic of the particles, such as their size. This can be done in accordance with methods which have been utilized in the past by utilizing some suitable separating method which does not depend upon the size of the particles and thereafter grading the particles as to size by some other suitable method, such as by screening. Applicant has discovered a separating device and method which is effective to perform both operations at the same time so that the particles are effectively removed from the liquid medium carrying them and are simultaneously graded as to size.

It is an object of the invention to provide an improved device for changing the concentration of solid particles in a liquid medium carrying the solid particles.

It is still another object of the invention to provide an improved method for changing the concentration of solid particles carried by a liquid medium.

Still a further object of the invention is to provide an improved device for selectively changing the concentration of solid particles of different types carried by a liquid medium.

Still another object of the invention is to provide an improved method for selectively changing the concentration of solid particles carried by a liquid medium.

In accordance with the invention, a device for changing the concentration of solid particles carried by a liquid medium comprises an inlet for the liquid medium, an outlet for the liquid medium, and means for causing the liquid medium carrying the particles to flow between the inlet and the outlet in essentially a predetermined path. A space is provided between the inlet and the outlet which is adapted to hold some of the liquid medium in a relatively quiescent state but which is essentially out of the above-mentioned predetermined path. Means are provided for directing sonic energy across the above-mentioned path to drive certain of the above-mentioned particles out of the path and into this space mentioned above. By this arrangement, the concentration of solid particles in the liquid medium leaving the outlet is substantially less than in the medium entering the inlet, and the concentration of the solid particles in the above-mentioned space is substantially increased.

In accordance with a further modification of the invention, the device mentioned above is utilized for selectively changing the concentration of solid particles of different types carried by the liquid medium and includes a second space between the inlet and the outlet which is adapted to hold the liquid medium and which is essentially out of the above-mentioned path but closer to the outlet than the first-mentioned space so that particles of another of the above-mentioned types which are driven towards the first space by the sonic energy actually reach the second space. By this modification of the invention, the concentration of the particles in the liquid leaving the outlet is substantially less than that in the medium entering the inlet and the concentration of particles of one of the above-mentioned types in the first space is substantially increased while the concentration of the particles of the other of the above-mentioned types in the second space is substantially increased.

In accordance with another modification of the invention, a method is provided for changing the concentration of solid particles carried by a liquid medium which comprises causing the medium carrying the particles to flow between an inlet and an outlet in an essentially predetermined path. Sonic energy is directed across the path to drive certain of the particles out of the path and into a space between the inlet and the outlet which contains some of the liquid medium in a relatively quiescent state but which is essentially out of the above-mentioned predetermined path. By this method, the concentration of the particles in the liquid medium leaving the outlet is substantially less than that in the liquid medium entering said inlet and the concentration of the particles in the space mentioned is substantially increased.

In accordance with a further modification of the method just described, a feature of the invention comprises a method of selectively changing the concentration of particles of different size carried by the liquid medium. In this case also, the sonic energy is effective to drive particles of one of the types into the space mentioned but the method includes the further step of causing particles of another type which are driven towards the first space by the sonic energy actually to reach a second space between the inlet and the outlet which contains some of the liquid medium in a relatively quiescent state and which is essentially out of the path of flow between the inlet and the outlet but which is closer to the outlet than the first space mentioned above. By this method, the concentration of particles in the liquid medium leaving the outlet is substantially less than that in the liquid medium entering the inlet, and the concentration of particles of one of the above-mentioned types in the first space is substantially increased while the concentration of particles of another of the types in the second space mentioned above is substantially increased.

As used in this specification, the term "sonic energy" is intended to include frequencies within the audible range as well as frequencies above the range of audibility, commonly called "ultrasonic frequencies."

For a better understanding of the present invention, together with other and further objects thereof, reference is had to the following description taken in connection with the accompanying drawings, and its scope will be pointed out in the appended claims.

Figure 3:
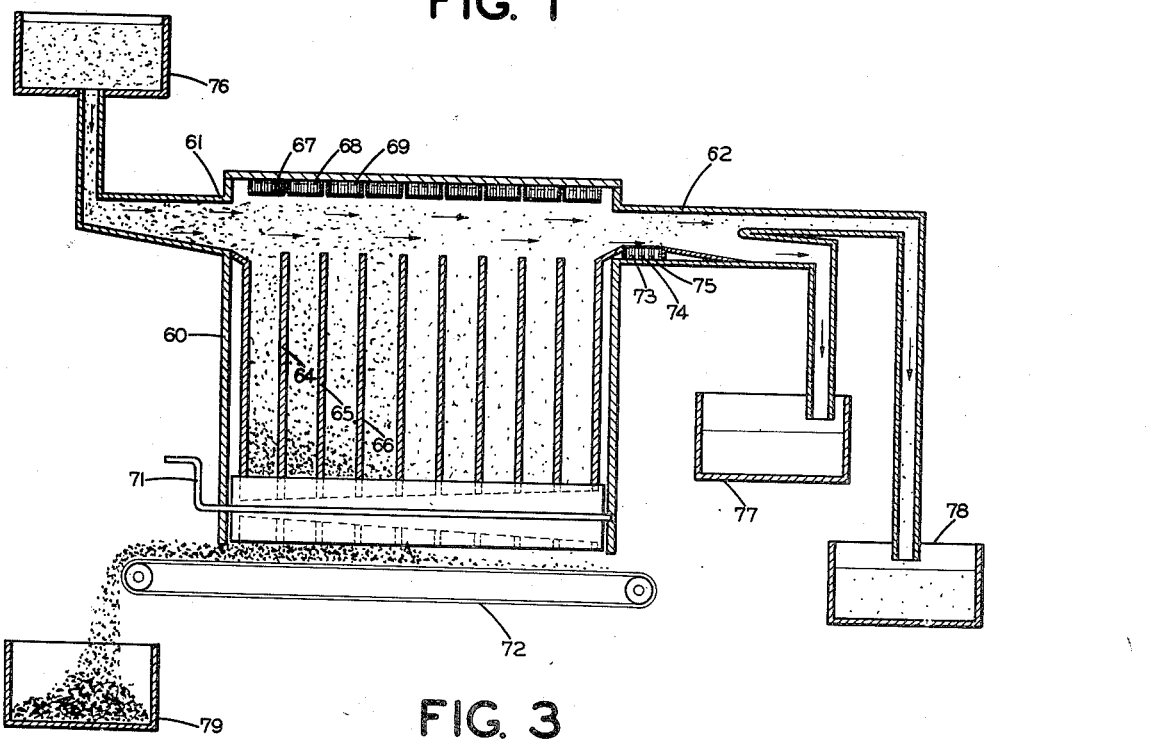
Figure 4:
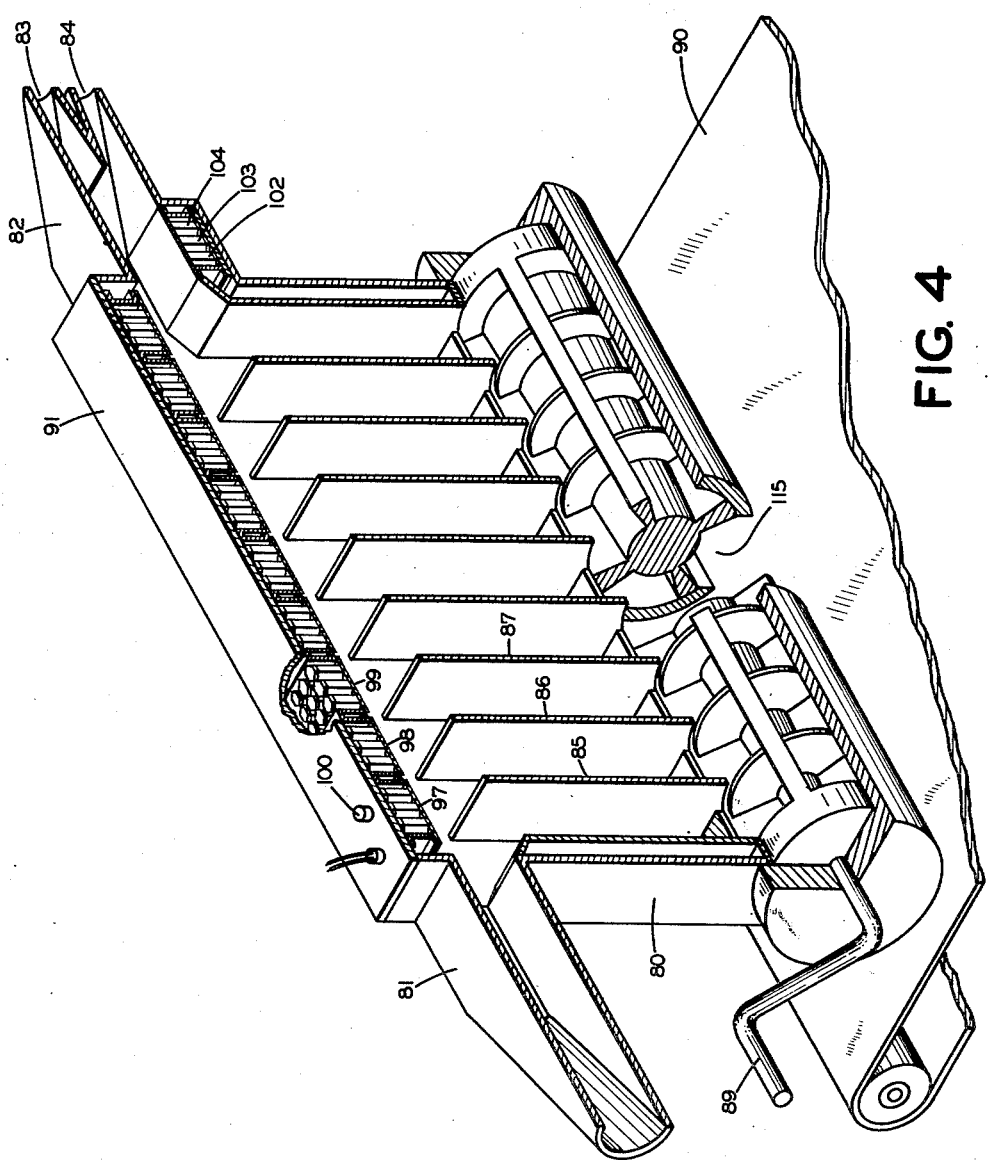
Figure 5:
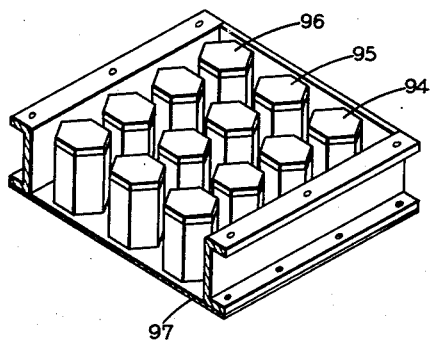
Figure 6:
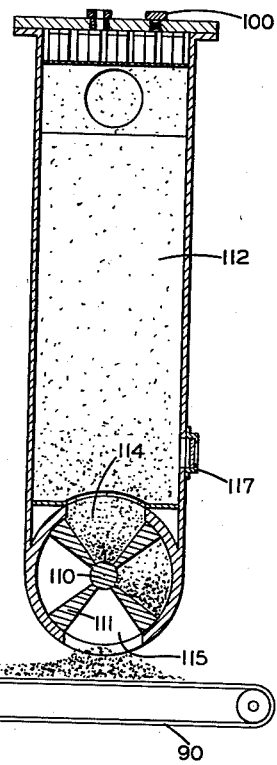
Figure 7:
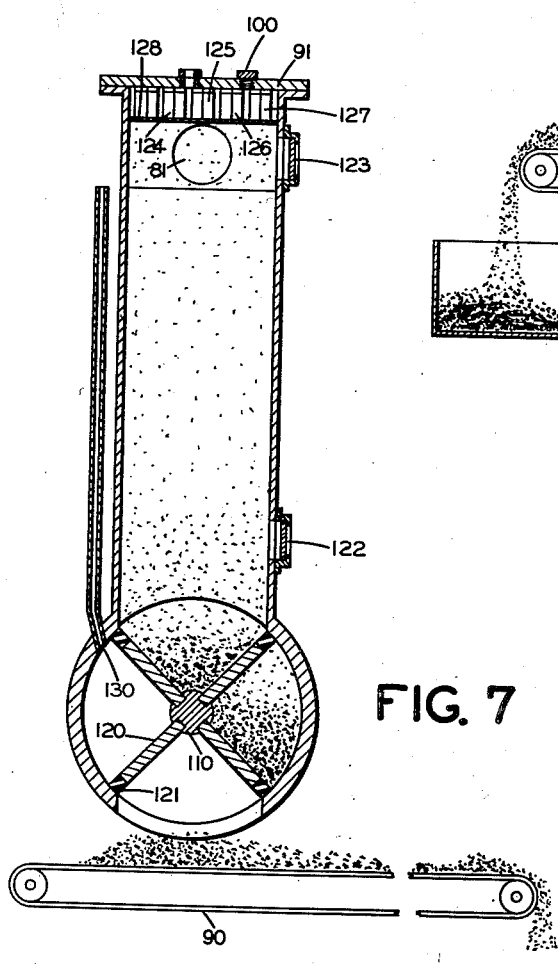

Fig. 1 of the drawings illustrates a device in accordance with the invention which is effective to change the concentration of solid particles carried by a liquid medium, specifically, the illustrated device is suitable for removing paper fibers from the waste waters of a paper mill; Fig. 2 is an isometric illustration with certain portions removed for the purpose of more clearly illustrating certain interior features of the arrangement, the device being one for removing wood fibers from the waste waters of a paper mill and operating on the general principles utilized in the arrangement of Fig. 1; Fig. 3 is a schematic illustration of still another device for removing wood fibers from the waste waters of a paper mill; Fig. 4 illustrates a device utilizing the features illustrated in the schematic arrangement of Fig. 3; Figs. 5 and 6 illustrate certain details of the apparatus of Fig. 4; while Fig. 7 illustrates an alternative arrangement of certain of the details illustrated in Fig. 6.

Referring now to Fig. 1 of the drawings, there is shown a device for concentrating solid particles carried by a liquid medium. Specifically, the arrangement illustrated is one for separating paper fibers from the waste waters of a paper mill. Certain of such waste waters are termed "white water" in the paper-mill industry.

The device illustrated in Fig. 1 effectively comprises a large tank, and the illustration is that of a horizontal section through this tank. This tank, designated by the reference numeral 10 in the drawing, effectively comprises an inlet 11 and an outlet 12 for the waste waters of the paper mill. The inlet comprises a stepped cylindrical member 13 fastened to the side of the tank over a number of vertical slots to permit the entry of the water into the tank. The outlet 12 is similarly constructed. Inside the tank, there are provided two longitudinal members 15 and 16, the function of which is to provide an essentially predetermined path for the waters flowing between inlet 11 and outlet 12. These longitudinal members or baffles are each provided with a series of holes opening into the path of water flow which has just been mentioned so that it is possible for some of the water flowing along the path to flow through such holes and fill up the remainder of the tank. Actually the baffles themselves, in a preferred embodiment of the invention, comprise a honeycomb structure with a series of rectangular ports along substantially the entire path of water flow between inlet 11 and outlet 12. In the arrangement illustrated, this honeycomb structure is provided by a second pair of baffles 17 and 18, together with partitions running between each pair of baffles in order to complete the honeycomb structure. Thus, between the baffles 15 and 17 are provided a series of cross members 20, 21, 22, etc., effectively dividing the space between baffles 15 and 17 into a number of vertical chambers along the path between inlet 11 and outlet 12. It will be understood that, preferably, a second series of cross members will be utilized effectively to divide the vertical chambers just mentioned vertically into smaller chambers, thus completing the honeycomb structure mentioned above. Ports 24 and 25 may be provided in the bottom of the tank, which ports may be normally closed but they may be opened at certain periods to drain off the water in which very large quantities of the paper fibers have collected. Alternatively, the ports 24 and 25 may be omitted and the paper fibers may be removed mechanically from the space between the partition 17 and the tank 10 and from the space between partition 18 and the tank 10.

There is also provided in the arrangement of Fig. 1, a means for directing sonic energy across the path between inlet 11 and outlet 12 so as to drive certain of the paper fibers carried along the path by the waste water through the ports in the honeycomb structure mentioned above and into the spaces between the partition 17 and the wall of the tank 10 and the partition 18 and the wall of tank 10. It will be seen that such spaces are adapted to hold some of the liquid medium flowing between the inlet 11 and the outlet 12 in a relatively quiescent state and that such spaces are essentially out of the predetermined path of flow between inlet 11 and outlet 12.

An electro-mechanical transducer is used for generating the sonic energy. As shown in Fig. 1, this transducer comprises a structure 27 which extends longitudinally in the path between inlet 11 and outlet 12. It will be understood that the structure 27 effectively provides a partition and extends throughout the tank vertically at least over the path of flow between inlet 11 and outlet 12 so that all of the water flowing between inlet 11 and outlet 12 must pass on one side or the other of this structure. Inside the structure 27, there is provided a series of generators of sonic energy. These may, for example, be comprised of magnetostrictive material, piezoelectric material, or any other suitable form of device for generating sonic or ultrasonic energy. Actually, as shown, the device comprises a series 30, 31, 32, etc. of fired barium titanate elements which have been prepolarized in a manner well understood in the art by the application thereto of a high unidirectional voltage to provide an arrangement which is effective, on the application of an A. C. potential thereto, to deliver sonic energy in the waste water flowing through the tank 10. United States Letters Patent No. 2,486,560, granted to Robert B. Gray on November 1, 1949 on an application filed September 20, 1946, describes in detail a manner of preparing and polarizing barium titanate elements which are suitable for use as the elements of 30, 31, 32 of Fig. 1.

In the device of Fig. 1, the structure 27 is illustrated as including an enclosure 34 for the elements 30, 31, 32, etc., and this enclosure may be comprised of some sound-transmitting material, such as rubber, and there may be included within this enclosure and around the elements 30, 31, 32 some suitable liquid medium, as castor oil.

In considering the operation of the arrangement of Fig. 1, it will be seen that waste water entering the inlet 11 flows on each side of the member 27 (as indicated generally by the heavy arrows) and out of the outlet 12. It will also be seen that, once the remainder of the tank has been filled, there will be little flow of water in the tank except upon the direct path between inlet 11 and outlet 12. When the supersonic energy generators are energized, as by the application thereto of an alternating voltage, sonic energy is directed from the structure 27 in each direction across the two sections of the path of water flow on each side thereof and through the ports formed by the longitudinal members 15, 17 and their cooperating cross members and the longitudinal members 16 and 18 and their cooperating cross members. Due to the fact that water is a fairly good transmitting medium for the sonic energy involved, there will be little reflection of the sonic energy from the water particles. However, due to the fact that the wood fibers are fairly good reflectors of the sonic energy involved, an appreciable amount of sonic energy will be reflected by each wood fiber in the path of the sonic energy. This creates a force on the wood fiber due to the radiation pressure involved. The nature of this action is somewhat analogous to the little device sometimes seen in jewelers' windows and which is driven by sunlight. These devices usually comprise four vanes arranged in a rotating structure and one side of each of the vanes is a good reflector and the other side of each of the vanes is darkened so as to absorb the sunlight. Thus, when light falls upon the vanes, there is a difference in pressure as between the two sides thereof which is effective to cause the rotation. In the present case, radiation pressure is effective to drive the particles across the path of water flow and into one of the ports formed by the honeycomb structure. It has been found in practice that a major portion of the paper fibers included in the waste waters of a paper mill can be removed in one pass through an arrangement such as is illustrated in Fig. 1. A recirculation can, of course, be utilized if desired in order to remove additional quantities of the paper fibers from the waste waters. The water in the spaces between the longitudinal member 17 and the tank 10 and the longitudinal member 18 and the tank 10 can be drained off at a relatively slow rate and effectively carry therewith a very much increased concentration of paper fibers. Alternatively, the ports 24 and 25 can be omitted and it will be found that the concentration of paper fibers in the water in tank 10 which is in a quiescent state is sufficient that the paper fibers can be removed mechanically.

Fig. 2 illustrates a modification of the invention which operates on the general principle illustrated in Fig. 1 and which is suitable for removing paper fibers from the white water of a paper mill. Fig. 2 thus comprises a tank 40 which is generally similar to the tank 10 of Fig. 1. An inlet 41 and an outlet 42 are provided in the tank. In Fig. 2, the white water flows from the inlet 41 through a number of slots 43, 44 in the wall of tank 40 and through the tank in a relatively well-defined path and out the outlet 42. It will be understood that slots (not shown in full) are provided in the tank wall adjacent outlet 42 and that these may be similar to slots 43, 44 provided for inlet 41. A longitudinal member 45 is provided for causing sonic energy to flow across the path of water flow between inlet 41 and outlet 42. Thus member 45 corresponds to member 27 of Fig. 1. In this case, some of the barium titanate elements are shown in some detail as hexagonal units 54, 55, etc. and their method of mounting will be described in more detail hereinafter.

In Fig. 2 the walls 46 and 47 extend through the tank from inlet 41 to outlet 42 and thus effectively correspond to baffles 15 and 16 of Fig. 1. The honeycomb structure opening into the path of water flow between walls 46 and 47 is more clearly shown in Fig. 2 and is identified by the reference numerals 48 and 49. The tank of Fig. 2 is provided with one wall thereof with a glass window 50 through which may be made an inspection of the portion of the tank carrying the quiescent liquid medium in order to determine the amount of paper fibers which have been collected or which are being collected. A similar window 51 is provided in the other wall of the tank. Pulp may be removed from a port 53, which corresponds generally to the port 25 of Fig. 1. It will be understood that a similar port, not shown, may be provided on the other side of the illustrated structure.

The operation of the arrangement of Fig. 2 will be readily apparent from a consideration of the operation of Fig. 1 which has been given above. Specifically, the waste water flows between the inlet 41 and the outlet 42 in a well-defined path on each side of the structure 45, and the sonic energy generated by the unit 54, 55, etc. is effective to carry the paper fibers through the honeycomb structure 49 where they may be removed through the port 53.

In Fig. 3 there is illustrated schematically a different apparatus and method, also suitable for separating paper fibers from the waste water of a paper mill. The principles of operation involved are generally similar to those discussed above. In the Fig. 3 arrangement, a tank 60 is provided having an inlet 61 and an outlet 62 so that a well defined path for the flow of waste water is provided between the inlet 61 and the outlet 62. The tank of Fig. 3 has a series of vertical baffles 64, 65, 66, etc., these baffles being effective to divide the bottom part of the tank into a number of separate containers across the top of which flows waste water in the path between inlet 61 and outlet 62. A number of generators of sonic energy 67, 68, 69 are provided and these are mounted on the top of the tank so as to send sonic energy across the path of water travel between inlet 61 and outlet 62 and into the vertical containers which are effectively provided by the baffles 64, 65, 66, etc. A hopper is provided in the bottom of each of the vertical compartments, and these hoppers may be emptied by the rotation of a crank 71 onto a conveyor belt 72. In one preferred embodiment of the invention, the sonic generators 67, 68, 69 operated at a frequency of 100 kc./sec. In order to remove particles which are not removed by the action of the sonic generators 67, 68, 69, a further series of sonic generators 73, 74, 75 are provided operating at a higher frequency, preferably around 400 kc./sec. White water is supplied to the tank 60 from a reservoir 76 and the clear water coming out of the outlet 62 is collected in a reservoir 77 while the fibers which are driven upward by the action of the sonic energy from elements 73, 74, 75 are collected in a reservoir 78. The wood fibers from the conveyor belt 72 are collected in a container 79.

In considering the operation of the arrangement of Fig. 3, it will be seen that white water from the reservoir 76 enters the inlet 61 and flows in a generally well-defined path across the top of the unit and out through the outlet 62, to the reservoir 77. The sonic energy generated by units 67, 68, 69, etc. is effective, by means of the radiation pressure on the paper fibers, to drive them in a downward direction so that they are ultimately collected in the vertical containers formed by the tank and the vertical baffles 64, 65 and 66, etc. As the bottom of these vertical containers become filled with paper fibers, the crank 71 is rotated to dump them on the conveyor belt 72 by which they are conveyed to the container 79. Actually the wood fibers utilized in making paper have a large variety of sizes and configurations. Their density is very close to that of water but some of the fibers do tend to float in water and some of such fibers tend to sink in water. It is generally found that some difficulty is encountered in removing smaller fibers by an arrangement of the type under consideration. It is for this reason that the additional series of elements 73, 74, and 75, etc. operating at a higher frequency, is provided. While the higher frequencies will not penetrate the waste-water coming directly from the paper mill as well as the lower frequencies, it has been found that after the larger fibers have been removed a sufficient penetration of the higher frequencies is obtained to provide a very effective separating action upon the smaller fibers remaining. Also, since there is less tendency to collect the fibers which tend to float by the action of the sonic energy generated by elements 67, 68, and 69, etc., it will be found that a relatively larger percentage of such floaters occurs in the outlet 62. For this reason the sonic energy of the elements 73, 74 and 75, etc. is directed in an upward direction, thus utilizing the tendency of the suspended material to float in the separating action. Therefore, by the action of the high-frequency sonic energy of elements 73, 74 and 75, etc. an additional amount of the wood fibers are separated from the water going into the reservoir 77 and are collected in the reservoir 78.

The device of Fig. 3 may be utilized in another manner. For example, it may be utilized to separate, on a selective basis, solid particles of different types carried by a liquid medium. As explained above, the force due to the sonic energy intending to effect the separating action is due to the radiation pressure which, in turn, depends upon the amount of energy the particular particle involved reflects. Assuming, therefore, that a number of particles of different size are present in the liquid medium flowing between the inlet 61 and outlet 62 and that they are all comprised of the same material, the amount of energy each particle reflects is, in general, dependent upon the area it presents to the transmission path of the sonic energy. This may not be true if the path length of the sonic energy through the particle involved becomes an appreciable portion of a half wavelength because materials which ordinarily reflect sonic energy become transparent thereto when the wave length of the energy through the material is one-half wavelength or odd multiples thereof. However, for the smaller particle sizes of a given material, the amount of energy reflected by the particle depends upon the area the particle presents to the sonic energy transmission path. Thus, for spheres, the force on each particle of the type under consideration is proportional to the square of the radius. However, by Stoke's law, the velocity of such a particle in a fluid medium is proportional to the force driving the particle and inversely proportional to its radius, which means that the ultimate velocity of the particles of the type under consideration and under the conditions assumed is directly proportional to the radius. The device of Fig. 3 can therefore be used to separate such particles on the basis of the particle size. For example, consider a paint pigment which has been wet-ground and which therefore contains particles of a large number of sizes to be processed in the apparatus of Fig. 3. The heavier particles are deflected more readily by the sonic energy involved and therefore have a decided tendency to fall into one of the vertical containers closer to the inlet 61 while the smaller particles have less of a tendency to be deflected and fall into one of the vertical containers nearer the outlet 62. In such a case, the particles collected by the containers formed by the vertical members 64, 65 and 66, etc. are graded as to size at the same time that the separating action is effected.

It will be seen, therefore, that the apparatus described in Fig. 3 comprises a device for changing the concentration of solid particles carried by a liquid medium and that it comprises an inlet for the liquid medium and an outlet for the liquid medium together with means for causing the medium carrying the particles to flow between the inlet and the outlet in essentially a predetermined path. It will also be seen that the device includes a space, for example the space between vertical members 64 and 65, between the inlet 61 and the outlet 62, which space is adapted to hold some of the liquid medium in a relatively quiescent state. This space, however, is essentially out of the predetermined path of liquid flow between inlet 61 and outlet 62. It will also be seen that the elements 67, 68, and 69 comprise means for directing sonic energy across the path of liquid flow between inlet 61 and outlet 62 to drive certain of the particles carried by the liquid medium out of the direct path between inlet 61 and outlet 62 and into the space between vertical members 64 and 65. By this arrangement, the concentration of particles in the liquid medium leaving the outlet 62 is substantially less than that in the liquid medium entering the inlet 61, and the concentration of the solid particles in the space between members 64 and 65 is substantially increased.

From another point of view, it will be seen that the device of Fig. 3 is one for selectively changing the concentration of solid particles of different types carried by a liquid medium between inlet 61 and outlet 62 and that this device includes a first space, for example the space between vertical members 64 and 65, between the inlet 61 and the outlet 62 which is adapted to hold some of the liquid medium in a relatively quiescent state but which is essentially out of the predetermined path between the inlet 61 and the outlet 62. Again the elements 67, 68, and 69 comprise a means for directing sonic energy across the path to drive particles of one of the types carried by the liquid medium out of the direct path between inlet 61 and outlet 62 and into the first space, namely, the space between the vertical members 64 and 65. The arrangement can be considered also to have a second space, namely, the space between the vertical members 65 and 66, between the linet 61 and the outlet 62. This second space is also adapted to hold some of the liquid medium and is essentially out of the path between the inlet 61 and the outlet 62 but is closer to the outlet 62 than the first space, namely, the space between the vertical members 64 and 65. Particles of another type which are driven towards the first space between vertical members 64 and 65 by the sonic energy of transducers 67, 68, and 69 actually reach, and are collected in, the second space between vertical members 65 and 66. It will be seen, therefore, that the concentration of the particles carried by the liquid medium leaving the outlet 62 is substantially less than that in the medium entering the inlet 61 and that the concentration of particles of one of the types mentioned above in the first space between vertical members 64 and 65 is substantially increased while the concentration of particles of another of these types in the second space between vertical members 65 and 66 is substantially increased.

In Fig. 4 there is shown an apparatus in detail which utilizes principles of operation described above in Fig. 3. This device comprises a tank 80, corresponding generally to tank 60 of Fig. 3. Tank 80 has an inlet 81 and an outlet 82. The inlet 81 can be connected to a reservoir corresponding to that indicated by the numeral 76 of Fig. 3 and the outlet 82 is divided into two sub-outlets 83 and 84 so that sub-outlet 83 can be connected to a tank corresponding to tank 78 of Fig. 3 while sub-outlet 84 can be connected to a tank corresponding to reservoir 77 of Fig. 3. The device of Fig. 4 also includes a series of vertical baffles 85, 86, 87, etc., effective to divide the lower portion of the tank 80 to a plurality of separate containers in the manner tank 60 of Fig. 3 is divided by the vertical members 64, 65, 66, etc. A separate hopper is provided for the bottom of each of the vertical containers formed by the vertical members 85, 86, 87, etc. and rotation of the crank 89 is effective to empty all of the hoppers simultaneously onto a conveyor belt 90 in a manner similar to that described in connection with the description of Fig. 3 above. The constructional details of the hopper device will be described in more detail hereinafter.

The device of Fig. 4 includes a top plate 91 on which are mounted a large number of hexagonal barium titanate elements of a length suitable for the frequency of sonic energy to be generated. These elements are shown in more detail in the illustration of Fig. 5 and are designated by the numerals 94, 95, 96, etc. These hexagonal barium titanate elements are electroded on each end and are resonant in their length mode at the frequency of sonic energy to be generated. Each of these hexagonal elements has a suitable lead brought out from each electrode on the ends of the element so that all of the hexagonal elements may be operated in parallel across a suitable source of electrical driving energy. The hexagonal elements 94, 95, 96, etc. are soldered to the plate 97. Some sound-insulating medium such as foam rubber is interposed between them and plate 91 (Fig. 4). The purpose of sound insulation is to prevent the sound energy generated by the hexagonal elements from being coupled into the plate 91. The plate 97 is one of a series of smaller plates 97, 98, 99, etc. and suitable side enclosures are provided so that the space surrounding the hexagonal elements 94, 95, 96, etc. can be completely filled with oil through a port 100 (see Fig. 4). A second port may be provided to permit circulation of the oil to provide more effective cooling, if required. In the Fig. 4 arrangement, the compartments formed by the separate bottom plates 97, 98, 99, etc. are interconnected so that the port 100 can be used to fill all of the compartments with oil in order that each of the hexagonal elements may be surrounded by oil.

Similarly, the high-frequency sonic generator mentioned above comprises hexagonal elements 102, 103, 104, etc. which are shorter than those used for producing the low-frequency energy because of the fact that the length resonant mode is used in each case. It will be understood that the construction of the elements themselves, their method of mounting, and their housing is otherwise similar to that described in connection with the elements 94, 95, 96, etc. and that these high-frequency elements are also surrounded by oil during operation. However, it will be understood that a separate source of sound energy of different frequency must be provided in order to drive the elements 102, 103, 104, etc. although, if desired, these elements could be operated on a harmonic frequency of the generator driving the low-frequency elements 94, 95, 96, etc.

It is believed that the operation of the device of Figs. 4 and 5 will be readily apparent from the description which has been given in connection with the operation of Fig. 3. It will be understood that the device of Fig. 4 can be operated to separate the paper fibers from the waste water of the paper mill or that, alternatively, it can be operated selectively to separate particles of different sizes or types carried by a liquid medium in the manner described above in connection with the description of Fig. 3. In such a case, the particles of different types are carried off by different portions across the width of the conveyor belt 90 in a manner which will be well understood by those skilled in the art.

In Fig. 6 there is shown an end view of a section of the rotor device for emptying the hoppers of the Fig. 4 arrangement. Thus the rotor itself comprises a shaft 110 having thereon a series of four blades, one of which is designated by the reference numeral 111. It will be understood that the shaft and the plates extend under all of the vertical hoppers formed by the vertical members 85, 86, 87, etc. of Fig. 4. An end view of one of these spaces, for example that between the vertical members 85 and 86, is designated by the reference numeral 112 of Fig. 6. As will be seen, in Fig. 4, the spacer members 85, 86, 87, etc. extend to the bottom of the housing so that the rotor, in the position shown, has a space 114 which is in a position for collecting the paper pulp which is driven into the space 112 by the sonic energy. Rotation of the crank 89 (Fig. 4) by 180°, therefore, will have the effect of rotating the space 114 so that it occupies the position which is occupied by the space 115 in Fig. 6, thus discharging onto the conveyor belt 90 the paper fiber which has been collected. The conveyor belt is driven so as to discharge the paper pulp into the container 116. A flange 117 is preferably provided in the side wall of the tank 80 to facilitate cleaning out the bottom of space 112 when this is required. It will be understood that, in operation, the crank 89 is periodically turned 90°, thus causing one of the spaces between the rotor blades 111 to be in a position to receive pulp from the chamber 112 and another of the spaces between rotor blade 111 to be in a position to discharge on the conveyor belt 90. Assuming that this rotation is clockwise as seen in Fig. 6, the righthand space between two of the rotor blades 111 will be filled with pulp waiting for discharge and the lefthand space between two of the rotor blades 111 will be empty and waiting its turn to be rotated to the position where it receives pulp from chamber 112.

Actually, in the process of separating paper fibers from the waste waters of a paper mill, it is found that those collecting spaces nearest the inlet 81 receive the most pulp. For this reason, the bottom of the pulp-receiving chambers of the rotor, one of which is designated by the numeral 114 of Fig. 6, is tapered so that these pulp-receiving spaces become more shallow towards the outlet end of the device. This can be seen most clearly from an inspection of Fig. 4.

Alternatively, a cross section through one of the pulp-receiving spaces formed by two of the vertical operating members 85, 86, 87, etc. may have the form illustrated in Fig. 7. Here the general structure is the same and similar characters have identical reference numerals, but in this case the rotor is formed by four plate members, one of which is represented by the reference numeral 120. These plate members are affixed along the shaft 110 for the entire length over which the separating chambers, formed by the walls 85, 86, 87, etc., extend. In this case, rubber wipers are provided on the ends of the plate 120. One of these wipers is designated by the reference numeral 121. An inspection window 122 is provided so that the amount of pulp which is collected in any one of the chambers can be determined visually. An inspection window 123 is also provided so that the path of flow of the white water between the inlet 81 and the outlet 82 can be visually inspected. Some of the hexagonally-shaped ceramic transducers are illustrated in Fig. 7 and are designated by the reference numerals 124, 125, 126, 127. The bottom plate to which these transducers are affixed is designated by the reference numeral 128, and it will be understood that the space between the members 91 and 128 is oil-filled so that the transducer elements 124, 125, 126, and 127 operate in oil or other non-conducting cooling liquid at all times.

Preferably the conveyor belt 90 and the shaft 110 are driven together by a gear or by a belt so that, upon rotation of the shaft 110, a new set of plates 120, 120 are brought into position to receive pulp material and to discharge the material which is contained between the other two sets of plates. Simultaneously, the conveyor belt is moved forward by an amount which is sufficient to provide a space on the belt which is free of discharged material. The hole 130 is provided in the housing of Fig. 7 in order to allow trapped air to escape when the plates 120 are turned in a clockwise direction as seen in Fig. 7.

Air bubbles and other foreign matter which collects on the surface of 34, or on surfaces 97, 98, 99 may have the effect of reflecting the sonic energy and detrimentally affecting the operation. It may therefore be necessary in some cases to provide a mechanical arrangement for periodically removing such foreign material. A device similar to the wind-shield wiper used on automobiles has been found to be satisfactory.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A device for changing the concentration of solid particles carried by a liquid medium, comprising: a liquid-conducting structure having an inlet and an outlet and defining therebetween a flow path for said liquid medium; a chamber disposed laterally of said path, said liquid-conducting structure having a lateral opening through which said chamber communicates with said path; and radiating means for directing sonic energy in a transverse direction across said path toward said opening, the unobstructed width of said chamber parallel to the direction of flow of said liquid medium along said path being of the same order of magnitude as the transverse distance across said path between said radiating means and said opening, and the depth of said chamber in said transverse direction being substantially greater than said transverse distance between said radiating means and said opening, whereby said chamber is adapted to retain some of said liquid medium out of said flow path so that solid particles driven by said sonic energy through said opening into said chamber may be removed from said flow to increase the concentration of said particles in said chamber while decreasing the concentration of said particles in said liquid medium leaving said outlet.

2. A device for selectively changing the concentration of solid particles of different types carried by a liquid medium, comprising: a liquid-conducting structure having an inlet and an outlet and defining therebetween a flow path for said liquid medium; a first chamber and a second chamber disposed laterally of said path, said liquid-conducting structure having a first lateral opening and a second lateral opening, on the same side thereof but closer to said outlet than said first opening, through which respectively said first chamber and said second chamber communicate with said path; and radiating means for directing sonic energy in a transverse direction across said path toward said first opening; the unobstructed width of each of said chambers parallel to the direction of flow of said liquid medium along said path being of the same order of magnitude as the transverse distance across said path between said radiating means and said first opening, and the depth of each of said chambers in said transverse direction being substantially greater than said transverse distance between said radiating means and said first opening, whereby each of said chambers is adapted to retain some of said liquid medium out of said flow path so that solid particles of one of said types driven by said sonic energy through said first opening into said first chamber may be removed from said flow while particles of another of said types which are driven toward said first opening actually reach said second chamber through said second opening and may be removed from said flow, thus decreasing the concentration of particles in said liquid medium leaving said outlet while increasing the concentration of said one type of particles in said first chamber and increasing the concentration of said other type of particles in said second chamber.

3. The method of changing the concentration of solid particles carried by a liquid medium which comprises: flowing said medium carrying said particles between an inlet and an outlet in an essentially predetermined path; directing sonic energy across said path to drive certain of said particles out of said path and into a chamber, which is disposed laterally of said path and communicates therewith between said inlet and outlet, toward which said sonic energy is directed, and which contains some of said liquid medium in a relatively quiescent and unturbulent state but which is essentially out of said predetermined path; and removing portions of said last-mentioned liquid medium from a region of said chamber remote from said path, whereby the concentration of said particles in said liquid medium leaving said outlet is substantially less than that in said liquid medium entering said inlet and the concentration of said particles in said liquid medium removed from said chamber is substantially increased.

4. The method of selectively changing the concentration of particles of different types carried by a liquid medium which comprises: flowing said medium carrying said particles between an inlet and an outlet in an essentially predetermined path; directing sonic energy across said path to drive particles of one of said types at predetermined lateral velocities out of said path and into a first chamber, which is disposed laterally of said path and communicates therewith between said inlet and said outlet, toward which said sonic energy is directed, and which contains some of said liquid medium in a relatively quiescent and unturbulent state but which is essentially out of said predetermined path, the intensity of said sonic energy being adjusted to drive said particles of another of said types across said path generally toward said first chamber but at relatively low lateral velocities which combine with the velocity of flow of said medium with resultant motions such that a substantial quantity of said last-mentioned particles actually reach a second chamber, which is disposed laterally of said path on the same side thereof as said first chamber and communicates with said path between said inlet and said outlet but closer to said outlet than said first chamber, which contains some of said liquid medium in a relatively quiescent and unturbulent state, and which is essentially out of said path; and removing from regions of said first and second chambers remote from said path respective portions of said relatively quiescent and unturbulent liquid medium, whereby the total concentration of said particles in said liquid medium leaving said outlet is substantially less than that in said medium entering said inlet and the concentration of said particles of said one of said types in the liquid medium removed from said first chamber is substantially increased while the concentration of said particles of said other of said types in the liquid medium removed from said second chamber is substantially increased.

5. A device for changing the concentration of paper fibers carried by the waste water of a paper mill, comprising: a liquid-conducting structure having an inlet and an outlet and defining therebetween a flow path for said waste water; radiating means for directing sonic energy in a transverse direction across said path to drive certain of said fibers out of said path; and a chamber disposed laterally of said path to receive said last-mentioned fibers, said liquid-conducting structure having a lateral opening through which said chamber communicates with said path and toward which said radiating means is directed, the unobstructed width of said chamber parallel to the direction of flow of said waste water along said path being of the same order of magnitude as the transverse distance across said path between said radiating means and said opening, and the depth of said chamber in said transverse direction being substantially greater than said transverse distance between said radiating means and said opening, whereby said chamber is adapted to retain some of said water, containing said fibers driven through said opening, in a sheltered region out of said flow path so that the concentration of fibers in said water leaving said outlet becomes substantially less than that in said water entering said inlet while the concentration of said fibers in said chamber is substantially increased.

6. A device for changing the concentration of paper fibers carried by the waste water of a paper mill, comprising: a liquid-conducting structure having an inlet and an outlet and defining therebetween a flow path for said waste water; radiating means for directing sonic energy of a frequency of approximately 100,000 cycles per second in a transverse direction across said path to drive certain of said fibers out of said path; and a chamber disposed laterally of said path to receive said last-mentioned fibers, said liquid-conducting structure having a lateral opening through which said chamber communicates with said path and toward which said radiating means is directed, the unobstructed width of said chamber parallel to the direction of flow of said waste water along said path being of the same order of magnitude as the transverse distance across said path between said radiating means and said opening, and the depth of said chamber in said transverse direction being substantially greater than said transverse distance between said radiating means and said opening, whereby said chamber is adapted to retain some of said water, containing said fibers driven through said opening, in a sheltered region out of said flow path so that the concentration of fibers in said water leaving said outlet becomes substantially less than that in said water entering said inlet while the concentration of said fibers in said chamber is substantially increased.

7. A device for changing the concentration of paper fibers of different types carried by the waste water of a paper mill, comprising: a liquid-conducting structure having an inlet and an outlet and defining therebetween a flow path for said waste water; first radiating means disposed with relation to the interior of said liquid-conducting structure so as to direct sonic energy at approximately 100,000 cycles per second in a transverse direction across said path to drive fibers of one of said types out of said path; second radiating means similarly disposed with relation to the interior of said liquid-conducting structure but closer to said outlet for directing sonic energy at approximately 400,000 cycles per second in a transverse direction across said path to drive fibers of another of said types out of said path; and a first chamber and a second chamber disposed laterally of said path to receive said fibers of said one type and of said other type respectively, said liquid-conducting structure having a first lateral opening and a second lateral opening, on the same side thereof but closer to said outlet than said first opening, through which respectively said first chamber and said second chamber communicate with said path and toward which respectively said first radiating means and said second radiating means are directed, the unobstructed width of each of said chambers parallel to the direction of flow of said waste water along said path being of the same order of magnitude as the transverse distance across said path between one of said radiating means and the respective one of said openings, and the depth of each of said chambers in said transverse directions being substantially greater than said last-mentioned transverse distance, whereby each of said first and second chambers is adapted to retain some of said water, containing said fibers of said one type and said other type respectively driven through said respective first and second openings, in a sheltered region out of said flow path so that the total concentration of said fibers in said water leaving said outlet becomes substantially less than that in said water entering said inlet while the concentration of said fibers of said one type in said first chamber is substantially increased and the concentration of said fibers of said other type in said second chamber is substantially increased.

8. A device for changing the concentration of paper fibers carried by the waste water of a paper mill, comprising: a liquid-conducting structure having an inlet and an outlet and defining therebetween a generally horizontal flow path for said waste water; radiating means for directing sonic energy in a transverse direction downwardly across said path to drive certain of said fibers out of said path; and a chamber disposed laterally of said path to receive said last-mentioned fibers, the bottom part of said liquid-conducting structure having an opening through which said chamber communicates with said path and toward which said radiating means is directed, the unobstructed horizontal width of said chamber parallel to the direction of flow of said waste water along said path being of the same order of magnitude as the transverse distance across said path between said radiating means and said opening, and the vertical depth of said chamber below said opening being substantially greater than said transverse distance between said radiating means and said opening, whereby said chamber is adapted to retain some of said water, containing said fibers driven through said opening, in a sheltered region below said flow path so that the concentration of fibers in said water leaving said outlet becomes substantially less than that in said water entering said inlet while the concentration of said fibers in said chamber is substantially increased.

References Cited in the file of this patent

UNITED STATES PATENTS

| Number | Name | Date |
|---|---|---|
| 2,071,260 | Holden | Feb. 16, 1937 |
| 2,417,722 | Wolf | Mar. 18, 1947 |
| 2,470,741 | Gordon | May 17, 1949 |
| 2,498,292 | Naugle | Feb. 21, 1950 |

FOREIGN PATENTS

| Number | Country | Date |
|---|---|---|
| 356,783 | Great Britain | Sept. 10, 1931 |
| 500,271 | Great Britain | Apr. 29, 1937 |